United States Patent
Riegler et al.

[11] 3,948,576
[45] Apr. 6, 1976

[54] EXPANSION BEARING ASSEMBLY FOR A CONVERTER CARRYING TRUNNION

[75] Inventors: Ernst Riegler, Enns; Manfred Schmidt, Linz, both of Austria

[73] Assignee: Vereinigte Osterreichische Eisen- und Stahlwerke - Alpine Montan Aktiengesellschaft, Linz, Austria

[22] Filed: Apr. 3, 1975

[21] Appl. No.: 564,816

[30] Foreign Application Priority Data
Apr. 5, 1974 Austria .............................. 2862/74

[52] U.S. Cl. ................................. 308/6 R; 308/176
[51] Int. Cl.² ........................................ F16C 1/24
[58] Field of Search .......... 308/6 R, 72, 176, 207 R; 266/36 P, 36 R; 74/665, 410, 411, 714

[56] References Cited
UNITED STATES PATENTS

| | | | |
|---|---|---|---|
| 3,207,002 | 9/1965 | Lakin et al. | 266/36 P X |
| 3,311,427 | 3/1967 | Toth et al. | 308/6 R |
| 3,771,777 | 11/1973 | Fisher et al. | 266/36 P |
| 3,897,120 | 7/1975 | Riegler et al. | 308/176 X |

*Primary Examiner*—Philip Goodman
*Assistant Examiner*—Gene A. Church
*Attorney, Agent, or Firm*—Brumbaugh, Graves, Donohue & Raymond

[57] ABSTRACT

An expansion bearing assembly for a converter carrying trunnion comprises a bearing secured to the carrying trunnion and accommodating its angular and wobbling movements, and arranged in a housing. In the assembly the carrying trunnion is united with the spur gear wheel in a common bearing and drive housing. The bearing is axially shiftable on rollers.

15 Claims, 6 Drawing Figures

EXPANSION BEARING ASSEMBLY FOR A CONVERTER CARRYING TRUNNION

BACKGROUND OF THE INVENTION

The present invention relates to an expansion bearing assembly for a converter carrying trunnion with a bearing secured to the carrying trunnion and accommodating its angular (sagging) and wobbling movements. The bearing for instance is a slide, articulation, or ball and roller bearing that is axially shiftable on rollers.

In the fields of general engineering and gear making, it is customary to mount a shaft in a fixed bearing on one side and in an expansion bearing on the other side, in order to accommodate thermal expansion and assembly inaccuracies and in order to guarantee smooth operation.

Also in a converter plant, the converter carrying ring is usually mounted with one carrying trunnion in a fixed bearing and with the other in an expansion bearing. For the expansion bearing assembly several embodiments are known, e.g. the assembly according to U.S. Pat. No. 3,291,541, wherein the outer ring is inserted into a saddle-shaped element forming a sliding carriage together with the bearing and the sliding carriage is shiftable upon rollers on two paths at the lower side of the saddle. However, this kind of mounting requires rather a lot of space, because in this bearing construction, in addition to the bearing inset and the bearing housing, a separate gear unit is necessary, which gear unit consists of a drive housing, a spur gear wheel, an intermediate gear and a torque support; all of which have to be heavily built and therefore need a large, strong base. Bearing constructions of this type are unsuited, in particular, in cases where already existent converter plants have to be reconstructed for a larger capacity and housed in already existent hall constructions.

SUMMARY OF THE INVENTION

It is the object of the invention to avoid these disadvantages and difficulties and to create a spacesaving expansion bearing assembly comprising a driving gear.

According to the invention this object is achieved by uniting the carrying trunnion with the spur gear wheel and arranging them in a common bearing and drive housing mounted on a sliding carriage, which sliding carriage is supported by linear bearings that are secured to the base.

According to a preferred embodiment of the invention the spur gear wheel comprises a spherical-zone-shaped hub arranged on the carrying trunnion and a converter toothed wheel meshing with the hub. The spur gear wheel is mounted in bearings having spherical running faces, each bearing having an inner ring and an outer ring and all of the spherical faces having the same center.

The hub may have an arc-shaped external toothing and the converter toothed wheel a straight internal toothing. The external toothing of the hub is displaceable relative to the internal toothing of the converter toothed wheel.

Suitably the linear bearings are arranged in the plane of axes of the drive and bearing housing at either side thereof. The pinions and motors are flanged to the drive and bearing housing.

BRIEF DESCRIPTION OF THE DRAWINGS

These and other features of the invention will now be described in greater detail with reference to the accompanying drawings in which.

DESCRIPTION OF THE PREFERRED EMBODIMENT

Figure 3:
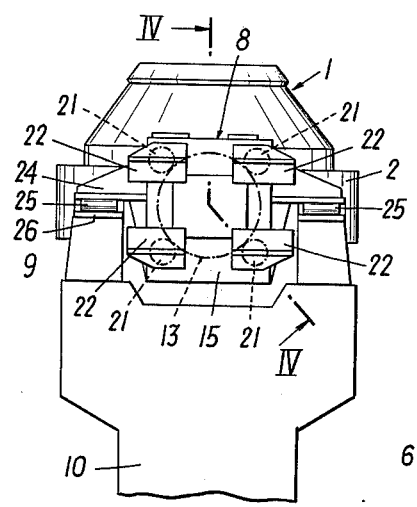
FIGS. 2 and 3 show the corresponding plan and side views, respectively.
Figure 1:
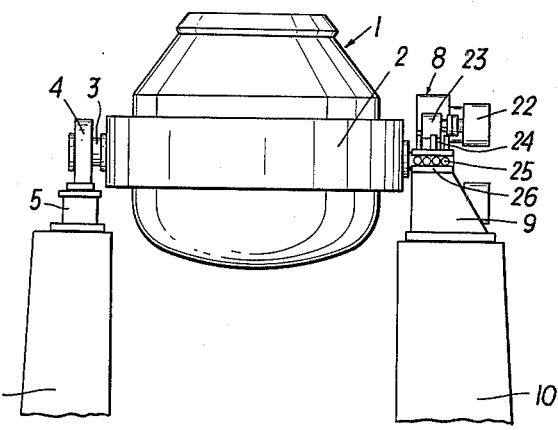
FIG. 1 shows a general view of a converter plant.
Figure 2:
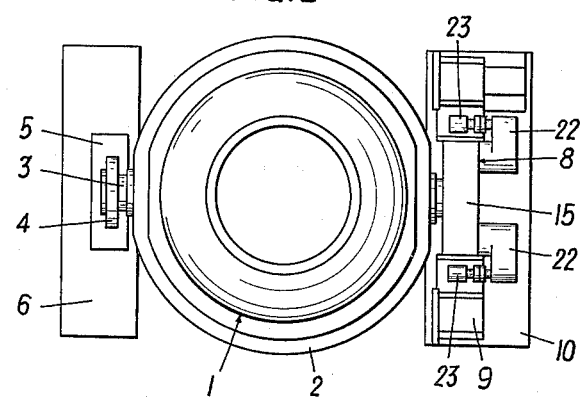

In FIGS. 1 to 3 the converter is denoted with 1, the carrying ring with 2, the fixed bearing trunnion with 3, the fixed bearing with 4, the fixed bearing stand with 5 and the base on the side of the fixed bearing with 6. The expansion bearing, which according to the invention is united with the drive, is generally denoted with 8 and is secured to the base 10 via the expansion bearing stand 9.

Figure 4:
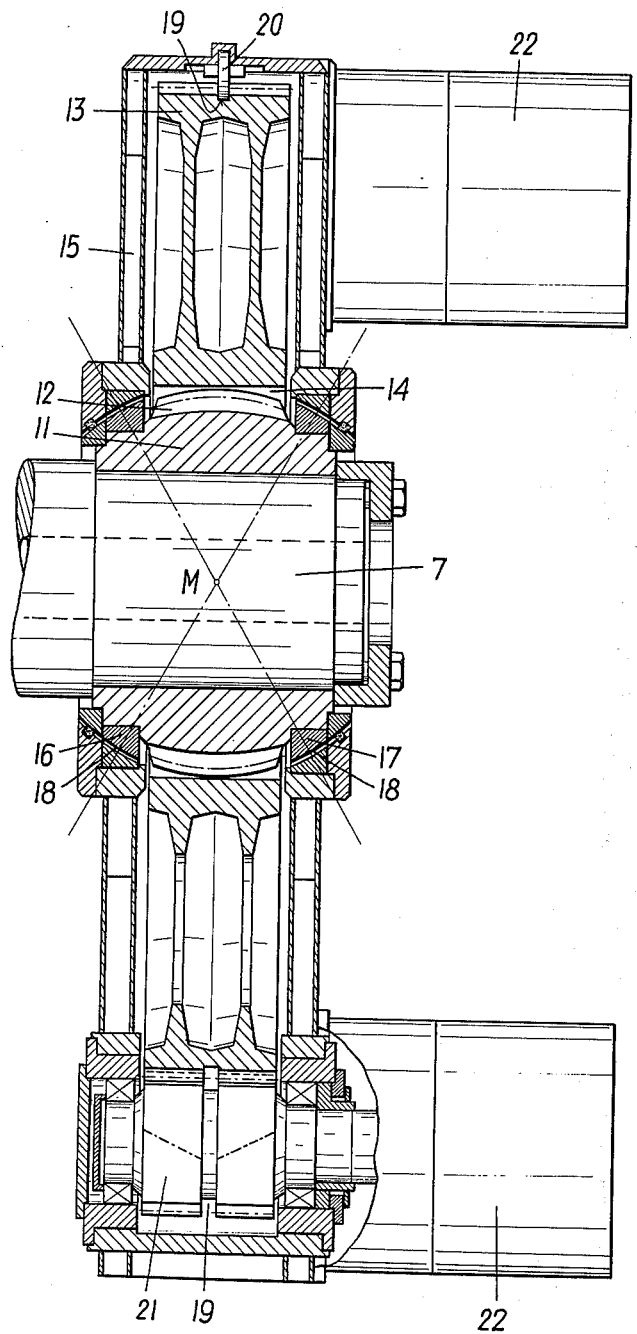
FIG. 4 is a section along line IV—IV of FIG. 1.

As can be seen in FIG. 4, a sperical-zone-shaped hub 11 is provided on the expansion bearing trunnion 7, e.g. by a shrink-fit, which hub has an arc-shaped external toothing 12 following the spherical face. This toothing is in engagement with the converter toothed wheel 13 which has a straight internal toothing 14. The spur gear wheel thus formed by the hub 11 and the converter toothed wheel 13 is enclosed in the housing 15 and mounted in bearings 16 and 17, each consisting of an inner ring and an outer ring. These bearings have spherical running faces 18 whose center M coincides with the center of the spherical hub face 11. Thus a displacement of the trunnion during deformations and saggings, respectively, relative to the fixed housing 15 is possible. The converter toothed wheel has an external herringbone-toothing, and between the teeth inclined to the left and the teeth inclined to the right there is a free space or recess 19. At the bottom of the recess 19 rollers 20 roll which are arranged in three different places on the periphery of the housing 15. The width of these rollers corresponds to the width of the free space 19, so that the drive pinions 21 can float into the toothed wheel 13. Suitably the motors 23 and the intermediate gear 22 are directly flanged to the housing 15. Thus a particularly compact construction is achieved (FIG. 2).

Instead of the internal toothing of the converter toothed wheel and the external toothing of the hub, crowned-ground rollers could be used for transmitting the torque. These rollers would be inserted into corresponding recesses of semi-circular cross-section in the hub on the one hand, and in the inner circle of the converter toothed wheel on the other hand. In a trunnion displacement the carrying trunnions pivot around the center M. The hub 11 follows the displacement, while the toothed wheel 13 remains in its position.

Figure 5:
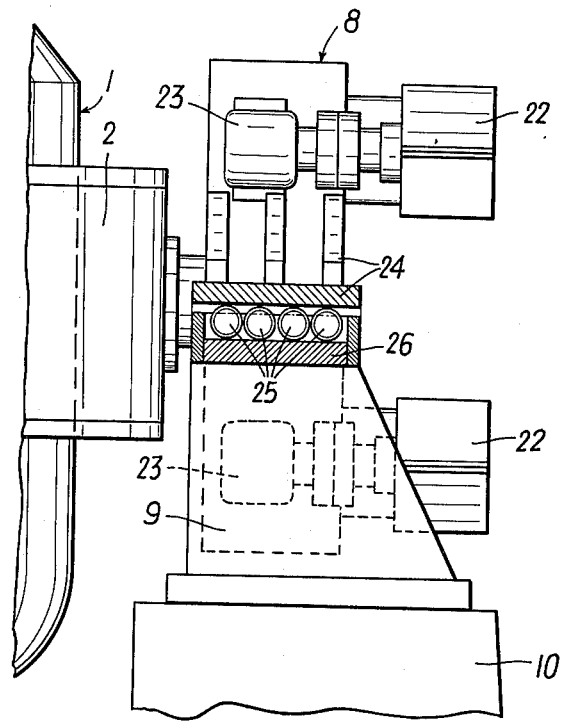
FIG. 5 illustrates a detail of FIG. 1 on an enlarged scale.

As can be seen from FIG. 5 the expansion bearing 8 together with the drive and bearing housing is mounted on a sliding carriage 24 which is axially shiftable on a linear bearing being provided with rollers 25. The rollers are guided in the guide 26 on the expansion bearing stand 9.

Figure 6:
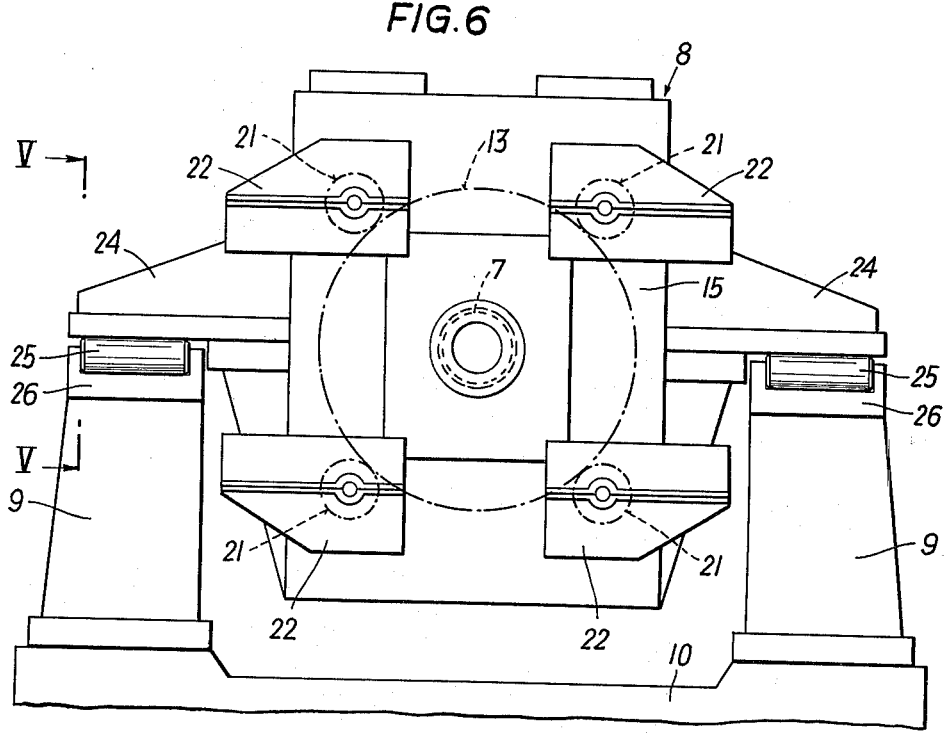
FIG. 6 is a side view of one half of the gear.

As can be seen in FIG. 6 the sliding carriage 24 together with the housing 15 and gear 22 rests on the rollers 25 in a horizontal plane $a - a$ crossing the trunnion axis. The two linear bearings are arranged at either side of the housing 15. Thus in case of thermal expansion an exact axial movement is guaranteed.

What we claim is:

1. An expansion bearing assembly for a converter carrying trunnion which comprises:
    a bearing secured to the carrying trunnion and capable of accommodating angular and wobbling movements of the carrying trunnion,
    a spur gear wheel connected to the carrying trunnion,
    a common bearing and drive housing jointly accommodating the carrying trunnion and the spur gear wheel, and supporting said bearing, and
    a base for supporting said housing.

2. An expansion bearing assembly as set forth in claim 1, wherein the bearing secured to the carrying trunnion is a slide bearing.

3. An expansion bearing assembly as set forth in claim 1, wherein the bearing secured to the carrying trunnion is an articulation bearing.

4. An expansion bearing assembly as set forth in claim 1, wherein the bearing secured to the carrying trunnion is a ball bearing.

5. An expansion bearing assembly as set forth in claim 1, wherein the bearing secured to the carrying trunnion is a roller bearing.

6. An expansion bearing assembly as set forth in claim 1, further including rollers, said bearing secured to the carrying trunnion being axially shiftable on said rollers.

7. An expansion bearing assembly as set forth in claim 1, further including a sliding carriage supported by linear bearings, said common bearing and drive housing being mounted on said sliding carriage supported by linear bearings, which bearings are fixedly secured to the base.

8. An expansion bearing assembly as set forth in claim 7, wherein the linear bearings are arranged in the axes plane of the bearing and drive housing at either side of said housing.

9. An expansion bearing assembly as set forth in claim 1, wherein each bearing is formed of an inner ring and an outer ring having spherical running faces, said bearings mounting the spur gear wheel, said spur gear wheel comprising a hub formed with a spherical zone and arranged on the carrying trunnion and a converter toothed wheel meshing with the hub, the spherical running faces of the bearings and the spherical zone of the hub having a common center.

10. An expansion bearing assembly as set forth in claim 9, wherein the hub has an arc-shaped external toothing and the converter toothed wheel has a straight internal toothing, the external toothing of the hub being displaceable relative to the internal toothing of the converter toothed wheel.

11. An expansion bearing assembly as set forth in claim 9, wherein the hub and the converter toothed wheel have corresponding recesses of semi-circular cross-section and wherein crowned-ground rollers are inserted in the corresponding recesses for enabling meshing of the hub with the converter toothed wheel.

12. An expansion bearing assembly as set forth in claim 1, wherein the spur gear wheel is comprised of a hub and a converter toothed wheel meshing therewith and further including rollers provided for adjusting the converter toothed wheel relative to the common bearing and drive housing.

13. An expansion bearing assembly as set forth in claim 12, wherein three rollers are arranged around the periphery of the common bearing and drive housing for adjusting the converter toothed wheel relative to the housing.

14. An expansion bearing assembly as set forth in claim 12, wherein the converter toothed wheel has a herringbone toothing with left-inclined and right-inclined teeth and a recess therebetween, the adjusting rollers running in said recesses.

15. An expansion bearing assembly as set forth in claim 1 further comprising drives and motors flanged to the common bearing and drive housing.

* * * * *